United States Patent
Sato et al.

(10) Patent No.: US 7,807,294 B2
(45) Date of Patent: Oct. 5, 2010

(54) NEGATIVE ELECTRODE FOR NON-AQUEOUS ELECTROLYTE SECONDARY BATTERY AND METHOD FOR PRODUCING THE SAME

(75) Inventors: Toshitada Sato, Osaka (JP); Yasutaka Kogetsu, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 784 days.

(21) Appl. No.: 11/631,489

(22) PCT Filed: Sep. 14, 2005

(86) PCT No.: PCT/JP2005/016966
§ 371 (c)(1),
(2), (4) Date: Jan. 4, 2007

(87) PCT Pub. No.: WO2006/043382
PCT Pub. Date: Apr. 27, 2006

(65) Prior Publication Data
US 2008/0020271 A1    Jan. 24, 2008

(30) Foreign Application Priority Data
Oct. 21, 2004    (JP) .............................. 2004-306819

(51) Int. Cl.
*H01M 6/00*      (2006.01)
*H01M 4/02*      (2006.01)
*H01M 4/64*      (2006.01)
*H01M 4/72*      (2006.01)

(52) U.S. Cl. .................... 429/209; 429/122; 429/233

(58) Field of Classification Search .................. 429/95, 429/209, 218, 223, 229, 231, 236, 245, 122, 429/233
See application file for complete search history.

(56) References Cited

U.S. PATENT DOCUMENTS
5,641,591 A    6/1997    Kawakami et al.

(Continued)

FOREIGN PATENT DOCUMENTS
CN    1382309 A    11/2002

(Continued)

OTHER PUBLICATIONS

Chinese Office Action issued in Chinese Patent Application No. CN 2005800267331, dated Aug. 1, 2008.

*Primary Examiner*—Jennifer K Michener
*Assistant Examiner*—Eli S Mekhlin
(74) *Attorney, Agent, or Firm*—McDermott Will & Emery LLP

(57) ABSTRACT

A negative electrode for a non-aqueous electrolyte secondary battery, including: an active material layer capable of electrochemically absorbing and desorbing at least Li; and a current collector sheet that supports the active material layer thereon and that does not react with Li, wherein the active material layer includes a plurality of deposited films or sintered films supported on a surface of the current collector sheet, and each of the deposited films or sintered films is provided with at least one groove formed in a side surface thereof, the groove extending from a top surface side towards the current collector sheet side thereof. It is preferable that the plurality of deposited films or sintered films are arranged in a grid configuration, a staggered grid configuration or a honeycomb configuration on a surface of the current collector sheet. It is preferable that, in a discharged state, the plurality of deposited films or sintered films have an average height of not less than 1 μm and not more than 30 μm.

21 Claims, 4 Drawing Sheets

U.S. PATENT DOCUMENTS

| | | |
|---|---|---|
| 6,685,804 B1 | 2/2004 | Ikeda et al. |
| 6,887,511 B1 | 5/2005 | Shima et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,410,728 B1 | 8/2008 | Fujimoto et al. |
| 2003/0180619 A1 | 9/2003 | Tamura et al. |
| 2005/0058906 A1 | 3/2005 | Sugiyama et al. |

FOREIGN PATENT DOCUMENTS

| | | | |
|---|---|---|---|
| EP | 1231651 A1 | * | 8/2002 |
| JP | 07272760 A | * | 10/1995 |
| JP | 8-88022 | | 4/1996 |
| JP | 8-255610 | | 10/1996 |
| JP | 09007638 A | * | 1/1997 |
| JP | 2000323126 A | * | 11/2000 |
| JP | 2002-83594 | | 3/2002 |
| JP | 2002-279974 | | 9/2002 |
| JP | 2002-373647 | | 12/2002 |
| JP | 2003-17040 | | 1/2003 |
| JP | 2005-116519 | | 4/2005 |
| WO | WO 01/31720 A1 | | 5/2001 |

* cited by examiner

NEGATIVE ELECTRODE FOR NON-AQUEOUS ELECTROLYTE SECONDARY BATTERY AND METHOD FOR PRODUCING THE SAME

RELATED APPLICATIONS

This application is a national phase of PCT/JP2005/016966, which claims priority from Japanese Application No. 2004-306819 filed Oct. 21, 2004, the disclosures of which Applications are incorporated by reference herein. The benefit of the filing and priority dates of the International and Japanese Applications is respectfully requested.

TECHNICAL FIELD

The present invention relates to a negative electrode that provides a non-aqueous electrolyte secondary battery having a high capacity and long life.

BACKGROUND ART

Extensive research and development has been carried out for using metallic lithium, which can achieve high energy density at high voltages, as a negative electrode for a non-aqueous electrolyte secondary battery. However, using metallic lithium as the negative electrode causes precipitation of dendritic lithium (dendrite) on the surface of the negative electrode during charging, so that the charge/discharge efficiency of the battery decreases. Furthermore, the dendrite may pierce through the separator and comes in contact with the positive electrode, thus causing the problem of internal short circuit. Therefore, lithium ion secondary batteries using, for their negative electrodes, carbon materials (for example, graphite) capable of reversibly absorbing and desorbing lithium have been put into practical use. Although carbon materials have a smaller capacity than metallic lithium, they are superior in terms of the safety and the cycle life.

However, the capacity of negative electrodes in practical use is about 350 mAh/g. This capacity is already close to the theoretical capacity (372 mAh/g) of graphite. Therefore, there is a limit to a further increase of the capacity of negative electrodes using graphite. On the other hand, in order to secure energy sources for future high-function portable devices, there is a demand for negative electrodes for which a further capacity increase has been achieved. For this purpose, a negative electrode material having a higher capacity than graphite is required.

Therefore, negative electrodes using an alloy are currently gaining attention. For example, an alloy including silicon or tin causes an electrochemical reversible reaction with lithium ion. Furthermore, some metallic elements have a very larger theoretical capacity than graphite. For example, the theoretical discharge capacity of silicon is 4199 mAh/g, which is 11 times that of graphite.

However, silicon and tin form a lithium-silicon alloy and a lithium-tin alloy when they react with lithium. At that time, their crystal structures undergo a change, so that the negative electrode experiences a very large expansion. For example, when silicon absorbs lithium to a maximum extent, it theoretically expands 4.1 times its initial volume. Graphite, for which intercalation reactions are utilized, expands only about 1.1 times, since lithium is intercalated between graphite layers.

Due to such expansion, a large stress is induced in the negative electrode. For this reason, the active material cannot be sufficiently fixed to a current collector with a binder, which is typified by polyvinylidene fluoride (PVDF) and styrene-butadiene rubber (SBR). Accordingly, there may be cases where the active material is detached from the current collector, or the contact points between the active materials are reduced. As a result, the internal resistance in the negative electrode increases to cause a reduction in the current collection properties, which also results in a reduction in the cycle characteristics. To prevent this, it is conceivable to increase the amount of the binder. However, if the amount of a material that does not contribute to charge/discharge increases, then the discharge capacity of the negative electrode decreases. Moreover, when a large amount of a non-conductive material is mixed in the negative electrode, the internal resistance in the negative electrode increases. Accordingly, the high rate discharge characteristics and the cycle characteristics decrease eventually.

Therefore, it has been proposed to form a film of a negative electrode active material comprising amorphous silicon on a current collector whose surface has been roughened (Patent Document 1). This proposal is intended to achieve a firm bonding between the active material and the current collector, thus preventing a reduction in the current collection properties and the cycle characteristics. However, according to the proposal of Patent Document 1, expansion of silicon during absorbing lithium can be allowed only in the thickness direction. Therefore, during charging (expansion), the active material particles press against each other, causing the electrolyte to be squeezed out from the active material layer. As a result, only the outermost surface of the negative electrode can come into contact with the electrolyte at the final stage of charge and the initial stage of discharge, so that electrochemical reaction is inhibited.

Furthermore, it has been proposed to place a mesh on a current collector before depositing the active material at the time of forming the negative electrode (Patent Document 2). This proposal is intended to dispose plural island-shaped deposited films that are separated from each other. With such a negative electrode, the electrolyte is retained without being squeezed out from the active material layer at the time of expansion. However, due to a large thickness of the mesh, the distance between the island-shaped deposited films is very large, so that wasted space is created inside the negative electrode. Moreover, the active material comes under the mesh, and it is therefore difficult to form plural deposited films, while separating films from each other and reducing the distance between the films. Consequently, the negative electrode has a very low capacity, which counteracts the advantage of the high capacity of the active material (for example, silicon).

Furthermore, it has been proposed to form an active material layer on a current collector, and then to form voids in the thickness direction in the active material layer by etching (Patent Document 3). This proposal is intended to divide the active material layer into plural minute regions. However, the effect of etching is greatly influenced by the surface roughness of the current collector, and is very difficult to control. Furthermore, in the case of chemical etching, many oxides are formed on the surface of the active material layer, so that there is concern that the reaction between the electrolyte and the active material may be inhibited. Moreover, in the case of using chemical etching, a phenomenon (undercut phenomenon) occurs in which a portion of the active material layer that is under the mask is also etched. Consequently, each of the minute regions has the shape of an inverted cone in which its portion in the vicinity of the current collector is cut away in a greater amount, so that breaking tends to occur in the vicinity of the current collector at the time of expansion.

Patent Document 1 Japanese Laid-Open Patent Publication No. 2002-83594

Patent Document 2 Japanese Laid-Open Patent Publication No. 2002-279974

Patent Document 3 Japanese Laid-Open Patent Publication No. 2003-17040

DISCLOSURE OF THE INVENTION

Problem to be Solved by the Invention

In view of the foregoing, the present invention secures a flow path of an electrolyte in an active material layer in a high-capacity negative electrode using a high-capacity element (for example, silicon) as the active material. This realizes a state in which the active material and the electrolyte are constantly in contact. Furthermore, by using such a negative electrode, it is possible to obtain a non-aqueous electrolyte secondary battery that exhibits excellent charge-discharge cycle characteristics and high rate discharge characteristics (rate characteristics).

Means for Solving the Problem

The present invention relates to a negative electrode for a non-aqueous electrolyte secondary battery, including: an active material layer capable of electrochemically absorbing and desorbing at least Li; and a current collector sheet that supports the active material layer thereon and that does not react with Li, wherein the active material layer includes a plurality of deposited films or sintered films supported on a surface of the current collector sheet, and each of the deposited films or sintered films is provided with at least one groove formed in a lateral surface thereof, the groove extending from a top surface side towards the current collector sheet side thereof.

Here, it is preferable that the plurality of deposited films or sintered films each have an aspect ratio defined by "film thickness"÷"shortest width of top surface" of not less than 0.1. "Top surface" refers to the top surface of the deposited films or sintered films. Accordingly, it is preferable that each of the deposited films or sintered films has the shape of a minute column or cone with a small height. Examples of the cone include a prismoid, and a truncated cone (Frustum).

It should be noted that the deposited films are formed by various thin film forming processes, including, for example, sputtering, vacuum evaporation and CVD (chemical vapor deposition). In this case, the deposited films are thin films that do not include a resin component serving as the binder (binding agent).

The sintered films refer to thin films formed by sintering a coating of a paste including active material particles and a binder, for example.

The groove extending from the top surface side towards the current collector sheet side means a recess on a line extending from the top surface side towards the current collector sheet side, for example.

It is preferable that the plurality of deposited films or sintered films are arranged in a grid configuration, a staggered grid configuration or a honeycomb configuration on a surface of the current collector sheet.

It is preferable that, in a fully discharged state or the initial state immediately after production, the plurality of deposited films or sintered films have an average height of not less than 1 μm and not more than 30 μm. Further, it is preferable that each of the deposited films or sintered films has a high density, and has a porosity of not more than 50%.

It is preferable that, in a fully discharged state or the initial state immediately after production, the shortest distance between the deposited films or sintered films that are adjacent with each other is narrower than the shortest width of the top surfaces of those films.

It is preferable that each of the deposited films or sintered films includes an element M1 that electrochemically reacts with Li, and that the element M1 is at least one selected from the group consisting of Si, Sn, Al, Ge, Pb, Bi and Sb.

Each of the deposited films or sintered films may further include an element M2 that does not electrochemically react with Li. Furthermore, it is preferable that the element M2 is at least one selected from the group consisting of transition metal elements. Further, it is preferable that the element M2 is a constituent element of the current collector sheet.

It is preferable that the content of the element M2 is higher on the current collector sheet side than that on the surface side of each of the deposited films or sintered films. For example, it is preferable that the current collector sheet comprises the element M2, and that the element M2 is thermally diffused from the current collector sheet into the deposited films or sintered films. In the case of thermal diffusion, the concentration of the element M2 gradually decreases from the current collector sheet side of the deposited films or sintered films towards the surface side thereof.

It is preferable that the element M1 forms a low crystalline or amorphous region in each of the deposited films or sintered films. Here, the low crystalline region refers to a region in which the particle diameter of the crystallites (crystal grains) of the element M1 is not more than 50 nm. The amorphous region refers to a region that includes a broad peak in the range of $2\theta=15$ to $40°$ and in which no crystal is confirmed.

From the viewpoint of ensuring a high capacity, it is preferable that the content of the element M1 in each of the deposited films or sintered films is not less than 40 wt %.

The present invention also relates to a non-aqueous electrolyte secondary battery including: a positive electrode capable of absorbing and desorbing lithium; the above-described negative electrode; a separator interposed between the positive electrode and the negative electrode; and a non-aqueous electrolyte.

The present invention relates to a method for producing the above-described negative electrode for a non-aqueous electrolyte secondary battery, that is, a method for producing a negative electrode for a non-aqueous electrolyte secondary battery, the method including: i) forming a thin film including an active material capable of electrochemically absorbing and desorbing at least Li on a surface of a current collector sheet that does not react with Li; (ii) disposing a plurality of masks on the thin film; (iii) delivering fine particles into an exposed portion of the thin film that is not covered with the plurality of masks, thereby cutting away the exposed portion; and (iv) removing the plurality of masks from the thin film from which the exposed portion has been cut away.

The arrangement of the plurality of masks agrees with the arrangement of the plurality of deposited films or sintered films.

It should be noted that "shortest width of top surface (of the deposited films or sintered films)", which determines the aspect ratio of the deposited films or sintered films, agrees with the shortest width of the masks that are arranged on the thin film in the step (ii).

There is no particular limitation with respect to the method of forming the thin film in the step (i). For example, in the step (i), the thin film may be formed by sputtering, vacuum evaporation or a CVD method. The thin film may also be formed by forming a coating of a paste including active material particles and a binder on a surface of the current collector sheet, and sintering the coating. In the step (i), the thin film may also be formed by colliding active material particles with a surface of the current collector sheet.

There is no particular limitation with respect to the method of forming the masks in the step (ii). For example, in the step (ii), the plurality of masks can be formed with a photoresist. As the photoresist, it is preferable to use phenol resin, for example. In the step (ii), the plurality of masks can also be formed by printing a polymeric material on the thin film. It should be noted that it is preferable to apply a release agent onto the thin film before forming the plurality of masks.

It is preferable that the width of the groove of each of the deposited films or sintered films extending from the top surface side to the current collector sheet side is not more than ½ the shortest width of the top surface. Further, it is preferable that the depth of the groove is not more than ½ the shortest width of the top surface. Therefore, it is preferable that, in the step (iii), a diameter of the fine particles delivered into the thin film is not more than ½ the shortest width of each of the plurality of masks. Further, it is preferable that the fine particles include at least one selected from the group consisting of $Al_2O_3$, SiC and $Si_3N_4$.

Effect of the Invention

The negative electrode for a non-aqueous electrolyte secondary battery of the present invention enables securement of an electrolyte flow path, which has been a problem when a high-capacity material is used as the active material. Furthermore, the present invention provides a high-capacity non-aqueous electrolyte secondary battery that achieves both excellent charge/discharge cycle characteristics and excellent high rate discharge characteristics.

BEST MODE FOR CARRYING OUT THE INVENTION

Figure 1:
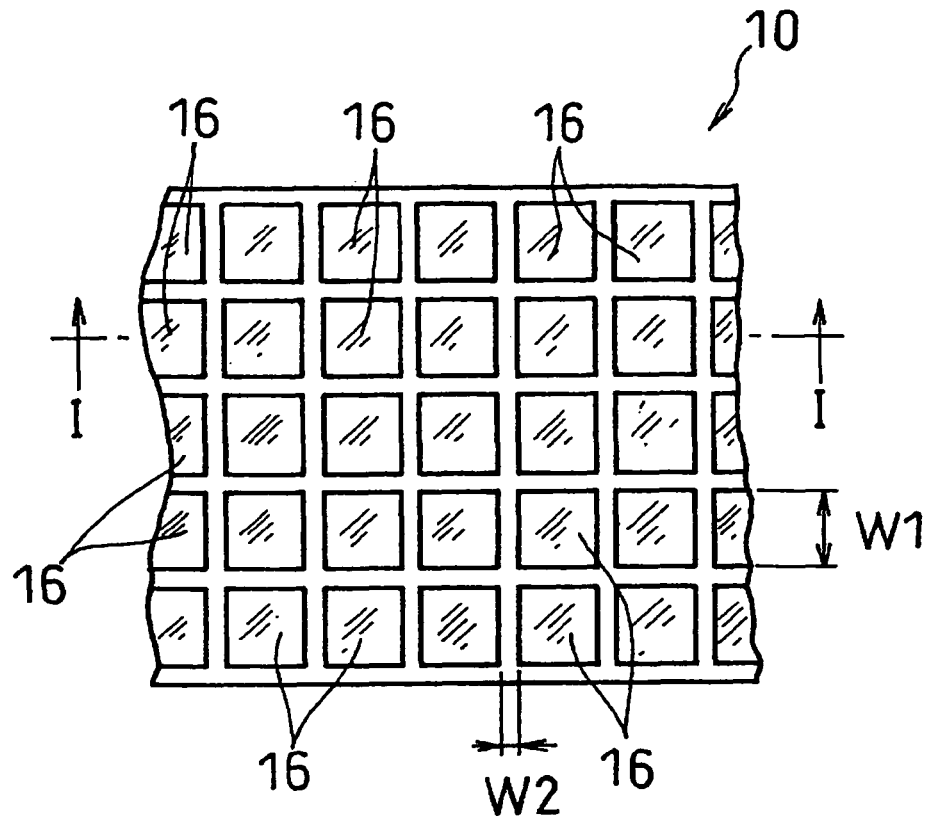
FIG. 1 is a top view of an example of a negative electrode for a non-aqueous electrolyte secondary battery according to the present invention.

FIG. 1 shows a top view of an example of a negative electrode for a non-aqueous electrolyte secondary battery according to the present invention. Further, FIG. 2 shows a cross-sectional view taken along the line I-I in FIG. 1.

Figure 2:
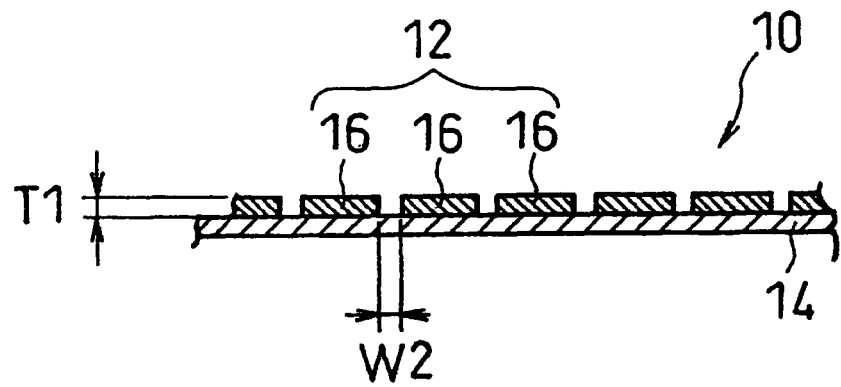
FIG. 2 is a cross-sectional view taken along the line I-I in FIG. 1.

In FIGS. 1 and 2, a negative electrode 10 comprises an active material layer 12 capable of electrochemically absorbing and desorbing at least lithium, and a current collector sheet 14 that supports the active material layer 12 thereon and that does not react with Li. The active material layer 12 is an aggregate of a plurality of deposited films or sintered films 16 supported on the surface of the current collector sheet 14.

The plurality of deposited films or sintered films 16 are arranged in a grid configuration on the current collector sheet 14. However, the arrangement of the plurality of deposited films or sintered films 16 is not limited to this, and various other arrangements are possible.

The deposited films or sintered films 16 have a substantially flat top surface, and form a quadrangular prism or quadrangular truncated pyramid having a small thickness. However, the shape of the deposited films or sintered films 16 is not limited to this, and may be various other prisms or truncated pyramids, or may be a cone or a truncated cone.

As shown in FIGS. 1 and 2, it is preferable that the plural deposited films or sintered films 16 are each island-shaped, and separately supported on the current collector sheet 14. When the plural deposited films or sintered films 16 are continuous with one another, the electrolyte does not penetrate into the active material in the vicinity of the current collector sheet, as with a thin film having irregularities. Furthermore, expansion stress is not alleviated when the active material absorbs lithium. Accordingly, there is the possibility that nonuniform cracks or breaks may be caused in the deposited films or sintered films.

It is preferable that the deposited films or sintered films 16 have an aspect ratio defined by "film thickness (T1)"÷"shortest width of top surface (W1)" of not less than 0.1. When the aspect ratio is less than 0.1, the proportion of the space in the active material layer into which the electrolyte is to enter becomes very small. Therefore, this becomes a factor for insufficient penetration of the electrolyte to the active material. From the viewpoint of obtaining a negative electrode that is particularly well-balanced in the electrolyte permeability and the capacity, the aspect ratio is preferably not less than 0.3.

It is preferable that, in a discharged state, the deposited films or sintered films 16 have a height (T1) of not less than 1 μm and not more than 30 μm. When the height of the deposited films or sintered films 16 is less than 1 μm, the thickness of the active material layer is extremely smaller than that of a common current collector sheet. Accordingly, the proportion of the active material layer in the battery is extremely small, which decreases the battery capacity. On the other hand, when the height of the deposited films or sintered films 16 is greater than 30 μm, the expansion and the contraction of the active material layer have a greater influence in the thickness direction. For this reason, repeated charge/discharge causes the deposited films or sintered films 16 to be broken, or detached from the current collector sheet, thus degrading the battery performance. From the viewpoint of ensuring the strength of the active material layer and the battery capacity in good balance, the height of the deposited films or sintered films 16 is preferably not less than 2 μm and not more than 20 μm.

It is preferable that, in a discharged state, the shortest distance (W2) between the deposited films or sintered films that are adjacent with each other is narrower than the shortest width (W1) of the top surfaces of those films. When the shortest distance (W2) is greater than the shortest width (W1) of the top surface of the films, the electrolyte has good penetration properties. However, the proportion of the space that does not contribute to the charge/discharge reaction in the negative electrode material mixture layer is extremely large, which decreases the battery capacity. Particularly, it is preferable that the relationship between the shortest width (W1) and the shortest distance (W2) satisfies $$0.1W1 \leq W2 \leq 0.8W1.$$

Figure 3:
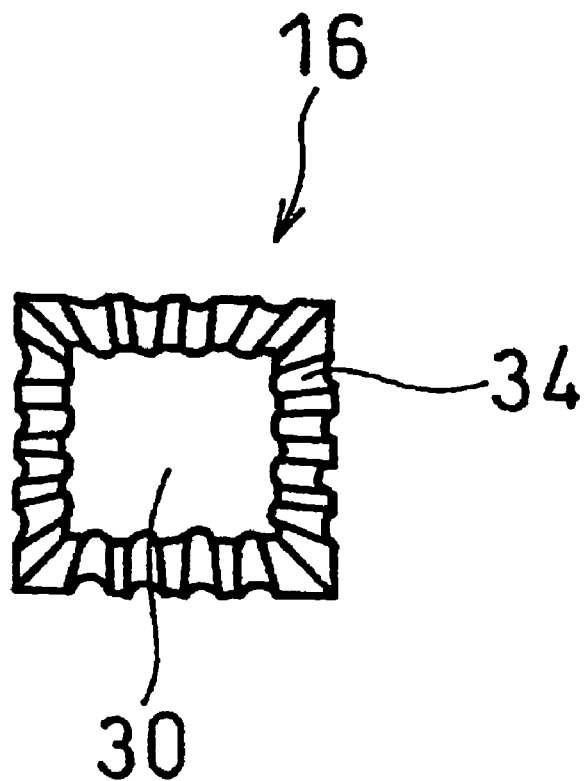
FIG. 3 is an enlarged view of the top surface of a deposited film or sintered film.
Figure 4:
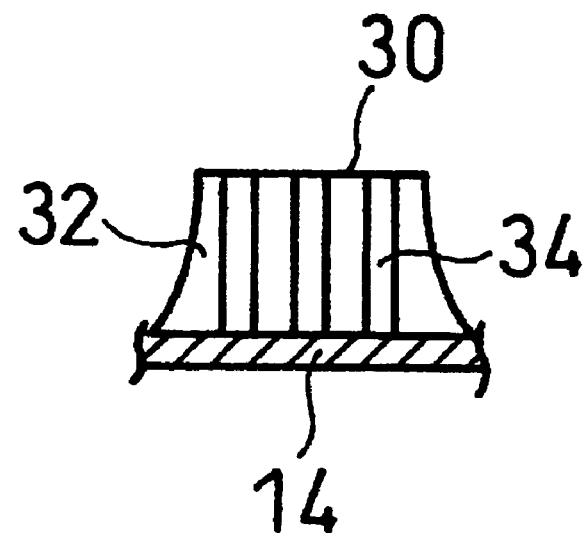
FIG. 4 is an enlarged view of a lateral surface of the deposited film or sintered film.

FIG. 3 shows an enlarged view of the top surface of the deposited film or sintered film 16. Further, FIG. 4 shows an enlarged view of a lateral surface of the deposited film or sintered film 16. As shown in FIGS. 3 and 4, at least one groove 34 extending from the top surface 30 side towards the current collector sheet 14 side is formed in a lateral surface 32 of the deposited films or sintered films 16. When the active material layer expands during charge and the interval between the deposited films or sintered films 16 is reduced, the groove 34 facilitates penetration of the electrolyte from the top surface 30 of the films to the vicinity of the current collector sheet 14. Accordingly, electrochemical reactions proceed favorably.

It is preferable that the depth of the groove is shallower in the vicinity of the current collector sheet 14 than in the vicinity of the top surface 30. By providing such a groove having an inclined depth, it is possible to cause the electrolyte to efficiently penetrate to the vicinity of the current collector sheet 14.

The width of the groove extending from the top surface 30 side of the deposited films or sintered films 16 towards the current collector sheet 14 side is preferably not more than ½, and particularly preferably not more than ⅒ the shortest width of the top surface 30 of the deposited films or sintered films 16. When the width of the groove 34 is greater than ½ the shortest width of the top surface 30, the proportion of the groove space in the active material layer 12 is large, so that the battery capacity decreases. On the other hand, the width of the groove 34 is preferably not less than ¹⁄₁₀₀ the shortest width of the top surface 30. When the width of the groove 34 is less than ¹⁄₁₀₀ the shortest width of the top surface 30, the groove width is too small, so that the penetration properties of the electrolyte to the active material layer 12 may be insufficient.

Similarly, the depth of the groove 34 is preferably not more than ½, and particularly preferably not more than ⅒ the shortest width of the top surface 30 of the deposited films or sintered films 16. When the depth of the groove 34 is greater than ½ the shortest width of the top surface 30, the proportion of the groove space in the active material layer 12 is large, so that the battery capacity decreases. On the other hand, the depth of the groove 34 is preferably not less than ¹⁄₁₀₀ the shortest width of the top surface 30. When the depth of the groove 34 is less than ¹⁄₁₀₀ the shortest width of the top surface 30, the depth of the groove is too shallow, so that the penetration properties of the electrolyte to the active material layer 12 may be insufficient. In addition, it is preferable that plural grooves 34 are present on each side surface of the deposited films or sintered films 16, and the sum of the widths of the grooves is preferably not more than ⅔ the shortest width of the top surface.

It is not necessary to form any groove on the top surface 30 of the deposited films or sintered films 16. The reason is that the top surface of the films inevitably comes in contact with the electrolyte. If a groove is formed in the top surface, then there is the possibility that a sharp portion at the edge of the groove faces the positive electrode via the separator, thus causing internal short circuit. Therefore, it is preferable that no groove is formed in the top surface 30 of the deposited films or sintered films 16.

It is preferable that the deposited films or sintered films 16 have a high density, and a porosity as low as possible. It is desirable that the porosity is not more than 50% at most, and is preferably not more than 30%, and particularly preferably not more than 10%. A low porosity gives a higher active material density in the deposited films or sintered films 16, so that it is possible to obtain a high-capacity negative electrode. When the porosity is higher than 50%, the negative electrode capacity is low. Furthermore, the active material layer 12 tends to be broken or detached at the time of expansion and contraction of the active material layer 12.

It is preferable that the deposited films or sintered films 16 include at least an element M1 that electrochemically reacts with Li. As the element M1, it is preferable to use at least one selected from the group consisting of Si, Sn, Al, Ge, Pb, Bi and Sb. These elements are high-capacity materials that can electrochemically react with a large amount of lithium. Among them, at least one selected from the group consisting of Si, Sn and Al is preferably used, and Si is particularly preferable.

The deposited films or sintered films 16 may be constituted by a simple substance of the element M1 that electrochemically reacts with Li, or may be constituted by an alloy or compound including the element M1. The simple substance, alloy and compound of the element M1 may be used singly or in combination of two or more of them. As the compound including the element M1, it is preferable to use at least one selected from the group consisting of an oxide, a nitride and a sulfide of the element M1. For example, an oxide represented by the chemical formula: $SiO_x$ (x<2) is suitable as a material constituting the deposited films or sintered films 16.

It is preferable that the element M1 forms a low crystalline or amorphous region in the deposited films or sintered films 16. The reason is that a high crystalline region tends to cause cracks during absorbing lithium, and has a strong tendency to reduce the current collection properties.

Here, the low crystalline region refers to a region in which the particle diameter of the crystallites (crystal grains) is not more than 50 nm. The particle diameter of the crystallites (crystal grains) is calculated from the half-width of the peak showing the highest intensity in a diffraction pattern obtained by X-ray diffraction, using the Scherrer's equation. The amorphous region refers to a region that includes a broad peak in the range of $2\theta=15$ to $40°$ in a diffraction pattern obtained by X-ray diffraction.

Each of the deposited films or sintered films 16 may further include an element M2 that does not electrochemically react with Li. The element M2 mainly serves the function of collecting current from the negative electrode. It is preferable that the element M2 is at least one selected from the group consisting of transition metal elements, and, among them, at least one selected from the group consisting of Cu, Ti, Ni and Fe is preferable, and Cu or Ti is particularly preferable.

It is preferable that the content of the element M2 is higher on the current collector sheet 14 side than that on the surface 30 side of the deposited films or sintered films 16. Such a structure makes it possible to achieve a stable current collection performance. Such a structure can be obtained, for example, by forming the active material layer 12 comprising the element M1 on the current collector sheet 14 comprising the element M2, and then performing a suitable heat treatment to diffuse the element M2 into the active material layer 12. A higher heat treatment temperature facilitates the diffusion of the element M2, thus achieving a stable current collection performance. However, from the viewpoint of preventing an increase in the crystallinity of the element M1, the heat treatment is performed at a temperature of not more than 600° C.

When both the elements M1 and M2 are mixed in the active material layer, the content of the element M1 in the active material layer is preferably not less than 40 wt %, and particularly preferably not less than 70 wt %, from the viewpoint of ensuring a high capacity.

Next, an example of the method for producing the negative electrode for a non-aqueous electrolyte secondary battery according to the present invention is described with reference to FIG. 5.

Step (i)

Figure 5:
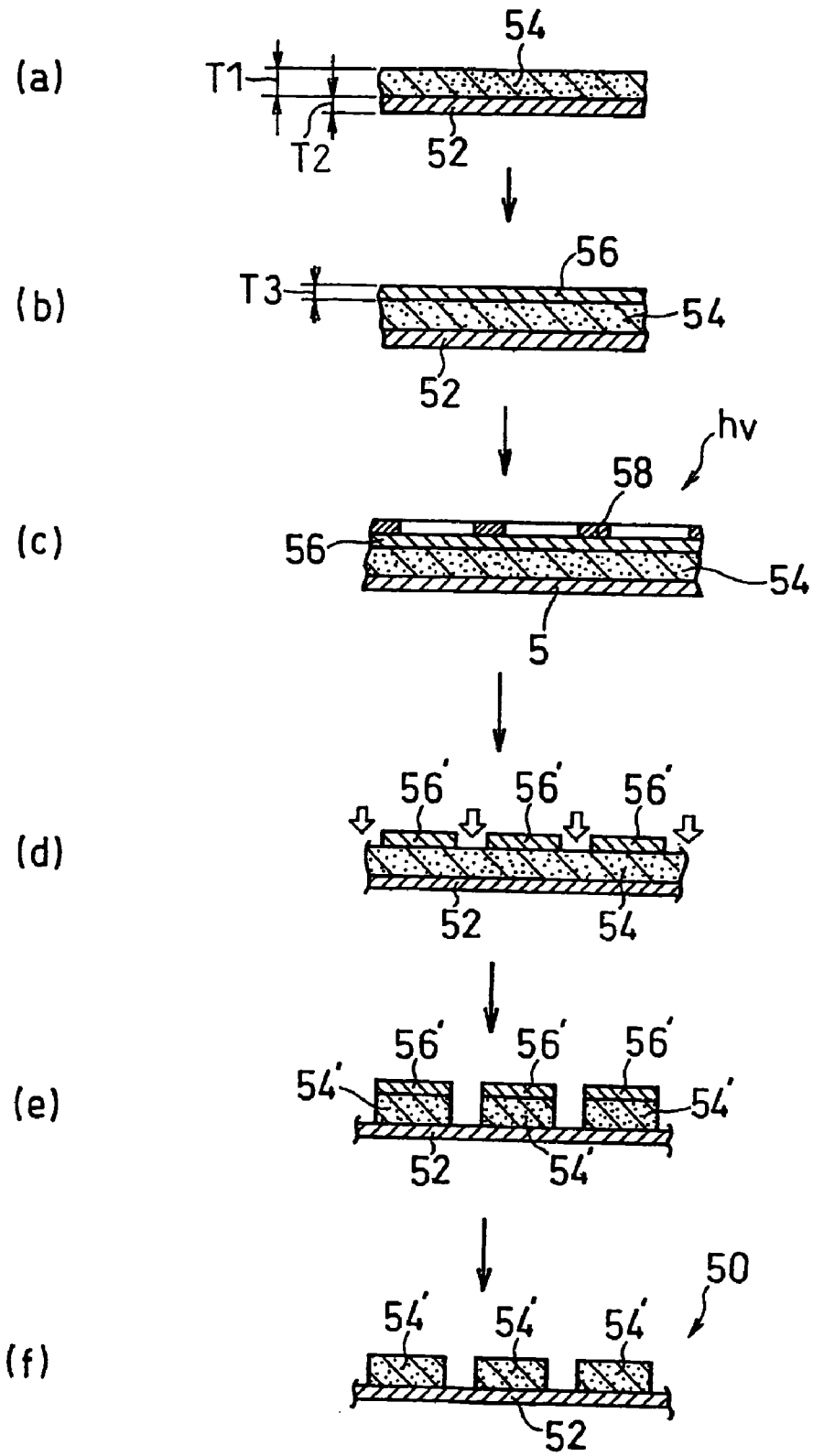
FIG. 5 is an explanatory diagram of an example of a method for producing a negative electrode for a non-aqueous electrolyte secondary battery according to the present invention.

First, a thin film 54 comprising an active material capable of electrochemically absorbing and desorbing at least Li is formed on the surface of a current collector sheet 52 that does not react with Li (FIG. 5(*a*)). The thickness (T2) of the current collector sheet is generally, but not particularly limited to, 8 to 40 μm. The thickness (T1) of the thin film corresponding to the thickness of the active material layer is generally, but not particularly limited to, 1 to 50 μm in a fully discharged state.

Although there is no particular limitation with respect to the method of forming the thin film, examples thereof include the following.

First, the thin film can be formed by a vacuum process. Vacuum processes include a sputtering method, an evaporation method and a CVD method, for example. With the vacuum process, it is possible to uniformly form a film of the element M1 on the surface of the current collector sheet. Among vacuum processes, in particular, an evaporation method forms a film at a higher speed than other methods, thus making it possible to reduce the process cost.

Second, the thin film can be formed by forming a coating of a paste including active material particles and a binder on the surface of the current collector sheet, and sintering the coating. Such a process is advantageous in terms of the production cost, since kneading of the active material particles and the binder and application of the resulting paste can be performed easily.

Although the binder is not particularly limited and may be any material that binds to the current collector sheet and the active material particles, it is preferably a material that decomposes into a gas at a temperature of not more than 500° C. Therefore, it is preferable to use butyral resin or acrylic resin, for example. Although the sintering process may be performed by heating, it is preferably performed by spark sintering or spark plasma sintering in which sintering is carried out by passing electric current.

Third, the thin film can be formed by causing the active material particles to collide with the surface of the current collector sheet. The particle diameter of the active material particles is preferably 0.1 to 45 μm. Such a process can be performed using an apparatus such as a shot blast (manufactured by Sintokogio, Ltd.).

By causing the active material particles to strike the surface of the current collector sheet at a high speed and a high pressure, the kinetic energy possessed by the particles is converted into thermal energy upon collision. Consequently, bonding with an extremely high strength is formed. This process can be performed at an ordinary temperature under an atmospheric environment, so that the process cost can be reduced. By heating the particles and/or the current collector sheet when causing the active material particles to strike the surface of the current collector sheet, it is possible to achieve further strong bonding.

Step (ii)

Next, plural masks are arranged on the thin film. Although there is no particular limitation with respect to the method of arranging the masks, examples thereof include the following. It should be noted that it is preferable to apply a release agent onto the thin film before forming the plural masks.

First, the plural masks can be formed with a photoresist (FIGS. 5(*b*) to (*c*)). By using a photoresist, it is possible to achieve a patterning with an extremely high precision. In this case, an uncured coating 56 comprising a photoresist is first formed on the thin film 54 comprising the active material (FIG. 5(*b*)). The thickness (T3) of the coating 56 is generally, but not particularly limited to, 0.5 to 10 μm.

Figure 6:
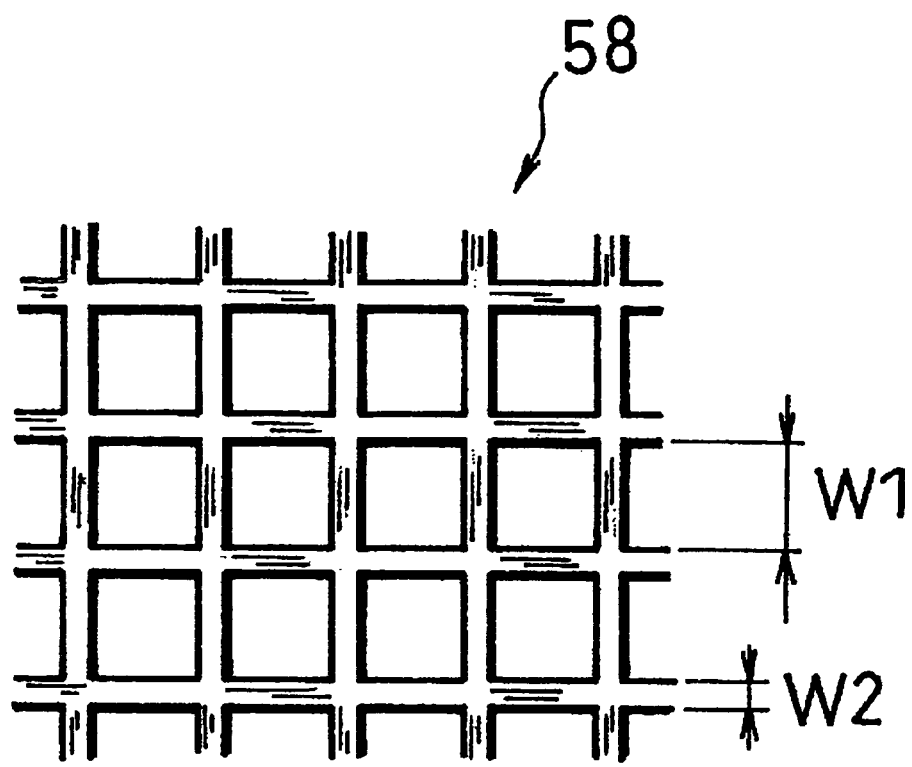
FIG. 6 is a top view of a grid-like metal cover used for a masking process.

Next, for example, a grid-like metal cover 58 as shown in FIG. 6 is placed on the coating 56 of the photoresist, and the coating 56 is subjected to exposure (FIG. 5(*c*)). The portions of the coating 56 that have been covered with the metal cover 58 are not cured, and therefore can be removed by washing (FIG. 5(*d*)). On the other hand, the portions of the coating 56 that have been exposed are cured and form masks 56'. It should be noted that phenol resin is preferably used as the photoresist material.

Second, the plural masks can be formed by printing a polymeric material on the thin film comprising the active material. The polymeric material is printed on the thin film, for example, using a screen having a grid-like pattern. In this case, the washing process is not necessary. It should be noted that polyurethane resin or the like is preferably used as the polymeric material used for printing. The above-described polymeric material may be any material that does not chemically react with the active material and is printable. The polymeric material may be used for printing in a state in which it is dissolved in a solvent.

Step (iii)

Next, fine particles are delivered into the exposed portions of thin film 54 that are not covered with the plural masks 56' from the direction indicated by the white arrows in FIG. 5(*d*), thereby cutting away the exposed portions. By this process, an active material layer comprising plural deposited films or sintered films 54' is obtained (FIG. 5(*e*)). There is no particular limitation with respect to the apparatus for delivering the fine particles, and various apparatuses used for blasting can be used. It should be noted that blasting is a method in which the portion to be processed is polished by spraying fine particles comprising an abrasive material using compressed air, or successively projecting the particles with a rotor onto the portion to be processed. For the fine particles, it is preferable to use $Al_2O_3$, $SiC$ or $Si_3N_4$. These are very hard materials, and no particular problem will occur even if the fine particles themselves remain in the active material layer.

The width and the depth of the groove extending from the top surface side of the deposited films or sintered films toward the current collector sheet side can be controlled by the diameter of the fine particles used here. Therefore, the diameter of the fine particles delivered into the thin film may be decided in accordance with the pattern width (W2) of the metal cover 58. However, the diameter of the fine particles is preferably not more than ½, and particularly preferably not more than ¹⁄₁₀ the shortest width W1 of the masks 56' (that is, the shortest width of the top surfaces of the deposited films or sintered films) at the least. It should be noted that when the diameter of the fine particles is greater than ½ the shortest width W1 of each mask, it is difficult to perform sufficient blasting.

Step (iv)

Next, the masks formed on the deposited films or sintered films 54' are removed. There is no particular limitation with respect to the method of removing the masks. For example, when the masks were formed using a photoresist, the masks can be removed by washing them with a predetermined cleaning solution. On the other hand, when the masks were formed by printing a polymeric material, the masks can be removed by allowing them to stand still in or washing them with a predetermined solvent. It should be noted that application of a release agent onto the thin film comprising the active material facilitates the removal of the masks.

Through the above-described steps, a negative electrode 50 for a non-aqueous electrolyte secondary battery that comprises the current collector sheet 52 and the plural deposited films or sintered films 54' supported on the surface of the current collector sheet is obtained (FIG. 5(f)). A non-aqueous electrolyte secondary battery using such a negative electrode can achieve both a high capacity and long life. Here, the non-aqueous electrolyte secondary battery includes a non-aqueous electrolyte, a separator and a positive electrode capable of absorbing and desorbing lithium, in addition to the negative electrode.

Although there is no particular limitation with respect to the positive electrode, it is preferable to use, as the positive electrode active material, a lithium cobalt oxide (for example, $LiCoO_2$), a lithium nickel oxide (for example, $LiNiO_2$), a lithium manganese oxide (for example, $LiMn_2O_4$ or $LiMnO_2$), an oxide in which the cobalt in a lithium cobalt oxide is partly replaced with another element (for example, $LiCo_{0.5}Ni_{0.5}O_2$), an oxide in which the nickel in a lithium nickel oxide is partly replaced with another element (for example, $LiNi_{0.7}Co_{0.2}Mn_{0.1}O_2$) or an oxide in which the manganese in a lithium manganese oxide is partly replaced with another element, for example.

As the non-aqueous electrolyte, it is possible to use a non-aqueous electrolyte in which a solute such as a lithium salt is dissolved in a non-aqueous solvent. Although there is no particular limitation with respect to the non-aqueous solvent, it is possible to use: cyclic carbonates such as ethylene carbonate, propylene carbonate, butylene carbonate and vinylene carbonate; chain carbonates such as dimethyl carbonate, methyl ethyl carbonate and diethyl carbonate; ethers such as 1,2-dimethoxyethane and 1,2-diethoxyethane; cyclic carboxylic acid esters such as γ-butyrolactone and γ-valerolactone; and chain esters such as sulfolane and methyl acetate. These may be used singly or in combination of two or more of them. In particular, it is preferable to use a mixed solvent of a cyclic carbonate and a chain carbonate.

While there is no particular limitation with respect to the solute dissolved in the non-aqueous solvent, examples thereof include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. These may be used singly or in combination of two or more of them.

As the non-aqueous electrolyte, it is also possible to use, for example, an inorganic solid electrolyte, an organic solid electrolyte, a solid polymer electrolyte or a gelled polymer electrolyte in which an electrolyte is retained in a polymer material.

Next, the present invention is specifically described by way of examples.

EXAMPLES 1 TO 14

(i) Production of Negative Electrodes

The materials listed in Table 1 were used as the negative electrode material. First, ingots of simple substances of the elements (all manufactured by Kojundo Chemical Laboratory Co., Ltd., purity: 99.999%, average particle diameter: 5 mm to 35 mm) were each placed in a graphite crucible. It should be noted that when plural elements were used, they were mixed at predetermined weight ratios listed in Table 1 before being placed in the crucible. This crucible and an electrolytic Cu. foil (manufactured by FURUKAWA CIRCUIT FOIL CO., LTD., thickness: 20 μm) serving as the current collector sheet were introduced into a vacuum evaporation apparatus, followed by vacuum evaporation using an electron gun. When plural elements were evaporated, plural electron guns were used.

In the case of Si, the evaporation was conducted under the conditions of an acceleration voltage of −8 kV and a current of 150 mA. In the case of other elements, the acceleration voltage was set to −8 kV, and the current was set in the range of 100 to 250 mA. The degree of vacuum was set to $3 \times 10^{-5}$ Torr in each case.

After the evaporation was completed for one side of the current collector sheet, further vacuum evaporation was also conducted for the back side (the surface with no deposition) in the same manner, thus forming a thin film comprising the active material on both sides. As a result of conducting X-ray diffraction analysis on these thin films, crystalline peaks attributed to Cu, which constituted the current collector sheet, were observed, and a broad peak was detected at a position of 2θ=15-40° in all the films. These results revealed that the active materials were amorphous.

The overall thicknesses of the negative electrodes were about 30 to 36 μm, and the thicknesses per side of the thin films comprising the active materials were about 5 to 8 μm. The thicknesses of the thin films were adjusted by varying the evaporation time. For example, when a film of Si was formed under the above-described conditions, a thin film having a thickness of 5 μm could be formed by a two-minute evaporation. The thicknesses of the thin films obtained in the examples are shown in Table 1.

TABLE 1

| Example No. | Composition | Weight ratio | Crystallinity | Film formation method | Thickness per side (μm) | Porosity (%) |
|---|---|---|---|---|---|---|
| 1 | Si | — | amorphous | vacuum evaporation | 5 | 6 |
| 2 | Sn | — | amorphous | vacuum evaporation | 6 | 10 |
| 3 | Al | — | amorphous | vacuum evaporation | 8 | 7 |
| 4 | Ge | — | amorphous | vacuum evaporation | 5 | 8 |
| 5 | Pb | — | amorphous | vacuum evaporation | 7 | 11 |
| 6 | Bi | — | amorphous | vacuum evaporation | 6 | 13 |
| 7 | Sb | — | amorphous | vacuum evaporation | 5 | 15 |
| 8 | Ti—Si | Ti:Si = 20:80 | amorphous | vacuum evaporation | 6 | 10 |

TABLE 1-continued

| Example No. | Composition | Weight ratio | Crystallinity | Film formation method | Thickness per side (μm) | Porosity (%) |
|---|---|---|---|---|---|---|
| 9 | Fe—Si | Fe:Si = 30:70 | amorphous | vacuum evaporation | 6 | 9 |
| 10 | Ni—Si | Ni:Si = 25:75 | amorphous | vacuum evaporation | 5 | 8 |
| 11 | Co—Sn | Co:Sn = 45:55 | amorphous | vacuum evaporation | 7 | 14 |
| 12 | Ti—Sn | Ti:Sn = 55:45 | amorphous | vacuum evaporation | 6 | 12 |
| 13 | Mg—Ge | Mg:Ge = 45:55 | amorphous | vacuum evaporation | 7 | 13 |
| 14 | Fe—Ni—Sn | Fe:Ni:Sn = 25:25:50 | amorphous | vacuum evaporation | 6 | 8 |

The current collector sheets supporting the thin films thereon were each punched into a test strip of a predetermined size, then the weight and the thickness of the test strip were measured, and the porosity of the thin film comprising the active material was calculated. The porosity was calculated using the following expression. As a result, all the thin films had a porosity of 5 to 15%. Thus, it was found that the active materials were deposited with a very high density. The porosities of the thin films obtained in the examples are shown in Table 1.

Porosity (%)=100−true density of active material× (weight of negative electrode−weight of current collector sheet)/(volume of negative electrode− volume of current collector sheet)×100

(ii) Formation of Masks

A photoresist material (manufactured by Shin-Etsu Chemical Co., Ltd.) was applied onto each of the thin films comprising the active materials to a thickness of 2 μm, and a mesh-like metal cover having openings of 20 μm×20 μm arranged in a grid configuration is placed thereon. Then, exposure was performed to cure the portions of the photoresist material that were not covered with the metal cover. It should be noted that a mesh formed by braiding a wire with a thickness of 10 μm was used as the metal cover.

After exposure, washing with a solvent was performed to remove the photoresist material at the portions that were covered with the metal cover. Consequently, masks comprising the cured photoresist material were formed in a grid configuration.

Hereinafter, the portions of the thin film that are masked with the photoresist material are referred to as "mask portions", and the length of one side of the masks is referred to as a "mask width". Further, the portions of the thin film where the photoresist material has been removed and the surface was thus exposed are referred to as "pattern portions", and a width of the pattern portions is referred to as a "pattern width". The mask width was about 20 μm, and the pattern width was about 10 μm.

(iii) Blasting (Patterning)

Next, blasting was performed for each of the thin films having the above-described masks. The blasting was performed by delivering $Si_3N_4$ fine particles (average particle diameter: 0.5 μm) into the surface to be treated with an injection pressure of 10 kgf/cm$^2$, using a microblasting apparatus (manufactured by Sintokogio, Ltd.). Consequently, the active material at the pattern portions was cut away. The width of the nozzle of the microblasting apparatus was set to 10 mmΦ, and the moving speed of the nozzle on the surface to be treated was set to 3 cm/sec. The cutting amount of the active material was controlled by the number of passage of the nozzle on the surface to be treated.

Although the fine particles also collided with the masks and thus caused scratches on the masks during blasting, this did not result in a complete removal of the masks. Accordingly, the active material at the portions of the thin film that were covered with the masks (mask portions) was not cut away but remained. From cross-sectional SEM (Scanning Electron Microscopy) observations, each of the pattern portions was cut away up to the position very near the current collector sheet, and exposure of Cu of the current collector sheet could be observed in some cases. Therefore, all the mask portions could be treated as being independent in an island shape.

(iv) Detachment of Masks

After the above-described blasting, the mask portions were ultrasonically cleaned in water, together with the current collector sheet, and the residual masks were further detached with a release agent. Thus, the active material layer comprising the plural deposited films was exposed, thereby completing a negative electrode.

The shape of each of the deposited films was a minute column or quadrangular truncated pyramid with a small height. Additionally, in side surfaces of each of the deposited films, plural grooves extending from the surface towards the current collector sheet were formed. The plural grooves were formed, since the thin films were cut by the fine particles when the fine particles were delivered from above by blasting. Further, no scratches were caused on the top surface of each of the deposited films.

The depth of the grooves was 0.9 μm at the maximum in the vicinity of the surface of the mask portions. Furthermore, it was 0.3 μm at the maximum in the vicinity of the current collector sheet. That is, there was a tendency in which the depth of the grooves decreases with decreasing the distance to the current collector sheet. This tendency is due to the fact that regions that are closer to the surface of the mask portions have greater chances to collide with the fine particles, and regions that are closer to the current collector sheet have fewer chances to collide with the fine particles. The width of the grooves was 0.7 μm at the maximum, and the average groove width was 0.5 μm.

The aspect ratios of the deposited films obtained in the examples are shown in Table 2, together with the mask widths and the pattern widths. It should be noted that the aspect ratio is defined by "film thickness" of deposited films÷"shortest width of top surface". Further, "film thickness" corresponds to "thickness per side" of the initially formed thin films comprising the active material, and the "shortest width of top surface" corresponds to the "mask width". Accordingly, the aspect ratio can be calculated by "thickness per side"÷"mask width".

TABLE 2

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 1 | 20 | 12 | 0.25 | 364 | 92 | 94 | 15 |
| 2 | 20 | 12 | 0.3 | 340 | 90 | 89 | 20 |
| 3 | 20 | 12 | 0.4 | 331 | 89 | 88 | 18 |
| 4 | 20 | 12 | 0.25 | 353 | 91 | 91 | 21 |
| 5 | 20 | 12 | 0.35 | 348 | 89 | 90 | 23 |
| 6 | 20 | 12 | 0.3 | 341 | 85 | 86 | 16 |
| 7 | 20 | 12 | 0.25 | 337 | 81 | 97 | 18 |
| 8 | 20 | 12 | 0.3 | 333 | 95 | 92 | 17 |
| 9 | 20 | 12 | 0.3 | 325 | 93 | 94 | 22 |
| 10 | 20 | 12 | 0.25 | 327 | 91 | 91 | 16 |
| 11 | 20 | 12 | 0.35 | 319 | 90 | 89 | 16 |
| 12 | 20 | 12 | 0.3 | 310 | 96 | 94 | 18 |
| 13 | 20 | 12 | 0.35 | 312 | 87 | 83 | 16 |
| 14 | 20 | 12 | 0.3 | 315 | 90 | 87 | 17 |

To evaluate the wettability between the negative electrode and the electrolyte (surface roughness), the electrolyte was dropped onto the active material layer of each of the negative electrodes in a charged state, and the contact angle between the active material layer and the electrolyte was measured. The results are shown in Table 2. It should be noted that, in a charged state, the active material is most expanded, so that the electrolyte is difficult to penetrate thereinto. This reduced the wettability, so that the measurement was carried out in that state.

The measurement of the contact angle was carried out in accordance with the "testing method of wettability of glass substrate surface" described in JIS R 3257. For the contact angle measurement, negative electrode samples having an area for each side of the active material of about 1 cm$^2$ were used. Further, as the electrolyte, an electrolyte in which lithium hexafluorophosphate (LiPF$_6$) was dissolved at a concentration of 1 mol/L in a mixed solvent of ethylene carbonate and diethyl carbonate at a volume ratio of 1:1 was used.

EXAMPLES 15 TO 23

Negative electrodes were produced in the same manner as in Example 1, except that the thickness of the thin film comprising the active material for each side of the current collector sheet was varied as shown in Table 3.

The film thickness was controlled by the evaporation time. That is, for example, the evaporation time was set to 4 minutes when a thin film having a thickness of 10 μm (Example 19) was formed, and the evaporation time was set to 7 minutes when a thin film having a thickness of 35 μm (Example 23) was formed.

The porosities of the thin films obtained in the examples are shown in Table 3. Additionally, the aspect ratios of the deposited films are shown in Table 4, together with the mask widths and the pattern widths. Further, the contact angles between the active material layers and the electrolyte are shown in Table 4.

TABLE 3

| Example No. | Composition | Crystallinity | Film formation method | Thickness per side (μm) | Porosity (%) |
|---|---|---|---|---|---|
| 15 | Si | amorphous | vacuum evaporation | 0.5 | 1 |
| 16 | Si | amorphous | vacuum evaporation | 1 | 2 |
| 17 | Si | amorphous | vacuum evaporation | 2 | 6 |
| 18 | Si | amorphous | vacuum evaporation | 6 | 5 |
| 19 | Si | amorphous | vacuum evaporation | 10 | 7 |
| 20 | Si | amorphous | vacuum evaporation | 13 | 10 |
| 21 | Si | amorphous | vacuum evaporation | 20 | 15 |
| 22 | Si | amorphous | vacuum evaporation | 30 | 25 |
| 23 | Si | amorphous | vacuum evaporation | 35 | 45 |

TABLE 4

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 15 | 20 | 12 | 0.025 | 132 | 94 | 63 | 38 |
| 16 | 20 | 12 | 0.05 | 201 | 95 | 70 | 31 |
| 17 | 20 | 12 | 0.1 | 288 | 94 | 94 | 22 |
| 18 | 20 | 12 | 0.3 | 360 | 95 | 92 | 18 |
| 19 | 20 | 12 | 0.5 | 373 | 91 | 90 | 21 |
| 20 | 20 | 12 | 0.65 | 386 | 84 | 90 | 20 |

TABLE 4-continued

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 21 | 20 | 12 | 1 | 391 | 76 | 88 | 17 |
| 22 | 20 | 12 | 1.5 | 395 | 66 | 75 | 18 |
| 23 | 20 | 12 | 1.75 | 400 | 33 | 58 | 17 |

EXAMPLES 24 TO 29

Negative electrodes were produced in the same manner as in Example 1, except that the thickness of the thin film comprising the active material for each side of the current collector sheet was fixed at 6 μm as shown in Table 5, and that the mask width and the pattern width were varied as shown in Table 6. The porosities of the obtained thin films were 5% (see Table 5). The aspect ratios of the deposited films are shown in Table 6, together with the mask widths and the pattern widths. Further, the contact angles between the active material layers and the electrolyte are shown in Table 6.

TABLE 5

| Example No. | Composition | Crystallinity | Film formation method | Thickness per side (μm) | Porosity (%) |
|---|---|---|---|---|---|
| 24 | Si | amorphous | vacuum evaporation | 6 | 5 |
| 25 | Si | amorphous | vacuum evaporation | 6 | 5 |
| 26 | Si | amorphous | vacuum evaporation | 6 | 5 |
| 27 | Si | amorphous | vacuum evaporation | 6 | 5 |
| 28 | Si | amorphous | vacuum evaporation | 6 | 5 |
| 29 | Si | amorphous | vacuum evaporation | 6 | 5 |
| 30 | Si | amorphous | vacuum evaporation | 1 | 2 |

TABLE 6

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 24 | 20 | 20 | 0.3 | 296 | 96 | 94 | 22 |
| 25 | 20 | 25 | 0.3 | 190 | 98 | 96 | 16 |
| 26 | 20 | 8 | 0.3 | 372 | 74 | 45 | 55 |
| 27 | 40 | 30 | 0.15 | 355 | 95 | 91 | 18 |
| 28 | 40 | 50 | 0.15 | 183 | 97 | 95 | 16 |
| 29 | 80 | 60 | 0.075 | 362 | 94 | 50 | 48 |
| 30 | 10 | 5 | 0.1 | 215 | 94 | 89 | 23 |

EXAMPLE 30

A negative electrode was produced in the same manner as in Example 1, except that the thickness of the thin film comprising the active material for each side of the current collector sheet was set to 1 μm as shown in Table 5, and that the mask width and the pattern width were set to 10 μm and 5 μm, respectively, as shown in Table 6. The porosity of the obtained thin film was 2% (see Table 5). Further, the contact angle between the active material layer and the electrolyte was 23° (see Table 6).

COMPARATIVE EXAMPLES 1 TO 7

Negative electrodes were produced in the same manner as in Example 1, except that the elements listed in Table 7 were used as the active material, that the thickness of the thin film comprising the active material for each side of the current collector sheet was varied as shown in Table 7, and also that the thin films were directly used as the active material layer, without performing mask formation and blasting. The porosities of the thin films are shown in Table 7. Further, the contact angles between the active material layers and the electrolyte are shown in Table 8.

TABLE 7

| Com. Ex. No. | Composition | Crystallinity | Film formation method | Thickness per side (μm) | Porosity (%) |
|---|---|---|---|---|---|
| 1 | Si | amorphous | vacuum evaporation | 5 | 6 |
| 2 | Sn | amorphous | vacuum evaporation | 6 | 10 |
| 3 | Al | amorphous | vacuum evaporation | 8 | 7 |
| 4 | Ge | amorphous | vacuum evaporation | 5 | 8 |
| 5 | Pb | amorphous | vacuum evaporation | 7 | 11 |

TABLE 7-continued

| Com. Ex. No. | Composition | Crystallinity | Film formation method | Thickness per side (μm) | Porosity (%) |
|---|---|---|---|---|---|
| 6 | Bi | amorphous | vacuum evaporation | 6 | 13 |
| 7 | Sb | amorphous | vacuum evaporation | 5 | 15 |

TABLE 7-continued

| Com. Ex. No. | Composition | Crystallinity | Film formation method | Thickness per side (μm) | Porosity (%) |
|---|---|---|---|---|---|
| 8 | graphite | — | application | 85 | 30 |
| 9 | Si | amorphous | vacuum evaporation | 5 | 6 |

TABLE 8

| Com. Ex. No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 1 | — | — | — | 421 | 10 | 32 | 78 |
| 2 | — | — | — | 399 | 11 | 24 | 75 |
| 3 | — | — | — | 415 | 16 | 28 | 69 |
| 4 | — | — | — | 416 | 18 | 26 | 70 |
| 5 | — | — | — | 409 | 11 | 30 | 74 |
| 6 | — | — | — | 411 | 13 | 22 | 73 |
| 7 | — | — | — | 405 | 14 | 23 | 71 |
| 8 | — | — | — | 120 | 98 | 91 | 18 |
| 9 | 20 | 12 | 0.25 | 364 | 76 | 61 | 42 |

COMPARATIVE EXAMPLE 8

A negative electrode paste was prepared by mixing 1 part by weight of carboxymethyl cellulose (manufactured by DAICEL CHEMICAL INDUSTRIES, LTD.) serving as the thickener and 1 part by weight of styrene-butadiene copolymer rubber (manufactured by JSR Corporation) serving as the binder to 100 parts by weight of artificial graphite serving as the negative electrode active material. The obtained negative electrode paste was applied onto the same Cu foil as used in Example 1, dried and rolled to form an active material layer having a thickness per side of 85 μm, thus obtaining a negative electrode. As a result of measuring the porosity of the obtained active material layer by the same method as described above, it was 30% (see Table 7). Further, the contact angle between the active material layer and the electrolyte was 18° (see Table 8).

COMPARATIVE EXAMPLE 9

After performing masking using a photoresist material in the same manner as in Example 1, etching was performed using an ICP (Inductively Coupled Plasma) dry etching apparatus (manufactured by Sumitomo Precision Products Co., Ltd.) to produce a negative electrode. Although the etching depth was 5 μm, observation made by SEM showed that no groove was formed on the side surfaces of each of the deposited films on the obtained active material layer. A battery was fabricated using this negative electrode. The contact angle between the negative electrode and the electrolyte during charging was 42° (see Table 8).

Next, cylindrical batteries were fabricated in the following manner, using the negative electrodes of Examples 1 to 30 and Comparative Examples 1 to 9, and then evaluated.

(i) Production of Positive Electrode $Li_2CO_3$ and $CoCO_3$ were mixed at a predetermined molar ratio, followed by heating at 950° C. to synthesize $LiCoO_2$. This was classified into a size of not more than 45 μm, and used as the positive electrode active material. A positive electrode material mixture paste was prepared by adding 5 parts by weight of acetylene black as the conductive agent, 4 parts by weight of polyvinylidene fluoride as the binder and a proper amount of N-methyl-2-pyrrolidone (NMP) to 100 parts by weight of the positive electrode active material, followed by sufficient mixing. A predetermined amount of the positive electrode material mixture paste was applied onto an Al core member, dried and rolled to obtain a positive electrode. It should be noted that the capacity of the positive electrode was appropriately adjusted according to the capacity of the negative electrode combined therewith.

(ii) Assembly of Cylindrical Batteries

Predetermined negative electrode and positive electrode were spirally wound with a band-shaped polyethylene separator having a wider width than that of the two electrode plates interposed therebetween, thus forming an electrode plate group. Polypropylene insulating plates were disposed above and below this electrode plate group, and the whole was inserted into a battery container. Thereafter, a step portion was formed on an upper portion of the battery container, and a non-aqueous electrolyte was injected subsequently. As the electrolyte, an electrolyte in which lithium hexafluorophosphate was dissolved at a concentration of 1 mol/L in a mixed solvent of ethylene carbonate and diethyl carbonate at a volume ratio of 1:1 was used. Finally, the opening of the battery container was sealed by a sealing plate, thereby completing a battery.

(iii) Evaluation

Discharge Capacity

Each of the cylindrical batteries was subjected to charging/discharging in a constant temperature bath set to 20° C. by the following steps <a> to <c>, and the discharge capacity was obtained. The results are shown in Tables 2, 4, 6 and 8.
<a> Constant Current Charge:
  charge current 0.2 C (1 C is one hour rate current)
  end-of-charge voltage 4.05 V
<b> Constant Voltage Charge:
  charge voltage 4.05 V
  end-of-charge current 0.01 C
<c> Constant Current Discharge:
  discharge current 0.2 C
  end-of-discharge voltage 2.5 V Capacity Retention Rate The batteries whose discharge capacities had been measured in the above-described manner were subjected to repeated charge-discharge cycles comprising the following steps <d> to <f> in a constant temperature bath set to 20° C. Then, the ratio of the discharge capacity at 100th cycle to the discharge capacity at the initial cycle was determined in percentage, and shown as the capacity retention rate (%). The closer the capacity retention rate is to 100%, it indicates a favorable cycle life. The results are shown in Tables 2, 4, 6 and 8.

<d> Constant Current Charge:
charge current 1 C
end-of-charge voltage 4.05 V
<e> Constant Voltage Charge:
charge voltage 4.05 V
end-of-charge current 0.05 C
<f> Constant Current Discharge:
discharge current 1 C
end-of-discharge voltage 2.5 V High Rate Discharge Characteristics The cylindrical batteries were subjected to charging/discharging by the following steps <g> to <i> in a constant temperature bath set to 20° C.

<g> Constant Current Charge:
charge current 0.2 C (1 C is one hour rate current)
end-of-charge voltage 4.05 V
<h> Constant Voltage Charge:
charge voltage 4.05 V
end-of-charge current 0.01 C
<i> Constant Current Discharge:
discharge current 0.2 C
end-of-discharge voltage 2.5 V Subsequently, the cylindrical batteries were subjected to charging/discharging by the following steps <j> to <l>.

<j> Constant Current Charge:
charge current 1 C
end-of-charge voltage 4.05 V
<k> Constant Voltage Charge:
charge voltage 4.05 V
end-of-charge current 0.05 C
<l> Constant Current Discharge:
discharge current 1 C
end-of-discharge voltage 2.5 V Subsequently, the cylindrical batteries were further subjected to charging/discharging by the following steps <m> to <o>.

<m> Constant Current Charge:
charge current 1 C
end-of-charge voltage 4.05 V
<n> Constant Voltage Charge:
charge voltage 4.05 V
end-of-charge current 0.05 C
<o> Constant Current Discharge:
discharge current 2.5 C
end-of-discharge voltage 2.5 V The ratio of the discharge capacity obtained when the discharge current was 1 C to the discharge capacity obtained when the discharge current was 2.5 C was determined in percentage, and shown as the high rate discharge characteristics (%). The results are shown in Tables 2, 4, 6 and 8.

Consideration

Examples 1 to 14 and 16 to 30 had a capacity higher than that of Comparative Example 8, which used graphite for the negative electrode, and they exhibited favorable capacity retention rate and high rate discharge characteristics. Furthermore, Example 15, in which the thickness of the active material layer was thinner than 1 μm, had a capacity comparable to that of Comparative Example 8. However, Example 23, in which the thickness of the active material layer was thicker than 30 μm, had a high capacity, but was decreased in both the charge/discharge cycle characteristics and the high rate discharge characteristics. Additionally, Examples 15, 16 and 29, in which the aspect ratio was smaller than 0.1, showed a tendency to decrease in the high rate discharge characteristics, as compared with other examples. Furthermore, Examples 25 and 28, in which the pattern width was wider than the mask width, had a lower capacity than other examples.

Examples 1 to 7 exhibited very excellent charge/discharge cycle characteristics and high rate discharge characteristics, as compared with Comparative Examples 1 to 7, for which blasting was not performed. This tendency is related to the fact that the negative electrodes of Examples 1 to 7 had contact angles lower than those of the negative electrodes of Comparative Examples 1 to 7, and exhibited increased wettability with the electrolyte. It seems that, since the negative electrodes of Examples 1 to 7 had been subjected to blasting, fine grooves were formed in the deposited films, facilitating penetration of the electrolyte.

In addition, in the case of Examples 15, 16 and 29, the wettability was reduced as compared with other examples, although the contact angles were smaller than those of the comparative examples. The reason seems to be that the presence of the grooves had less contribution since the aspect ratio was smaller than 1 and the space in the thickness direction was small. In addition, it seems that the wettability was reduced in Example 29 because of the mask width as large as 80 μm and the influence of the top surface having no groove.

Although Comparative Example 9 exhibited a high capacity and excellent life characteristics, the high rate discharge characteristics were reduced. Furthermore, Comparative Example 9 had low wettability, even though the negative electrode was constituted by plural deposited films. This is related to the fact that, since the thin film comprising the active material was patterned by etching, the side surfaces of each of the deposited films were very flat, and almost no groove was present thereon. It seems that the electrolyte was difficult to penetrate into the negative electrode of Comparative Example 9 especially when the active material expanded during charging, preventing the advancement of the electrode reaction.

In Tables 3 to 4, a tendency is observed in which the porosity increases with an increase in the thickness of the thin film comprising the active material. Further, a comparison between the contact angles of Example 15 and Example 23 shows that Example 21, which had a thick active material layer, had a smaller contact angle than that of Example 15, and the surface was extremely rough. On the other hand, it is seen that the contact angle is large and the active material layer had a flat surface in Example 15. The above-described tendency is due to the fact that evaporation needs to be performed for a long time in the case of forming a thin film having a large thickness. That is, this seems to be caused by nonuniform precipitation of the active material resulting from repeated deposition of the active material.

EXAMPLES 31 TO 32 AND COMPARATIVE EXAMPLES 10 TO 11

(i) Example 31

A negative electrode was produced in the same manner as in Example 1, except that a sputtering method was used as the method of forming the thin film comprising the active material, and that the thickness of the thin film for each side of a current collector sheet (an electrolytic Cu foil manufactured by FURUKAWA CIRCUIT FOIL CO., LTD, thickness: 20 μm) was 4 μm as shown in Table 9. The porosity of the thin film is shown in Table 9. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 10.

It should be noted that a bipolar RF sputtering apparatus and a Si target (manufactured by Kojundo Chemical Laboratory Co., Ltd., purity: 99.999%) were used in the sputtering method. During sputtering, Ar was flowed into the apparatus as the sputtering gas at a flow rate of 150 sccm, and the degree of vacuum in the apparatus was set to $3\times10^{-5}$ Torr.

(ii) Comparative Example 10

A negative electrode was produced in the same manner as in Example 31, except that the thin film was directly used as the active material layer, without performing mask formation and blasting. The porosity of the thin film is shown in Table 9.

TABLE 9

| Example No. | Composition | Crystallinity | Film formation method | Thickness per side (μm) | Porosity (%) |
|---|---|---|---|---|---|
| 31 | Si | amorphous | sputtering | 4 | 7 |
| 32 | Si | amorphous | sputtering | 4 | 7 |
| Com. Ex. 10 | Si | amorphous | CVD | 5 | 5 |
| Com. Ex. 11 | Si | amorphous | CVD | 5 | 5 |

TABLE 10

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 31 | 20 | 12 | 0.2 | 342 | 93 | 91 | 16 |
| 32 | — | — | — | 390 | 15 | 22 | 71 |
| Com. Ex. 10 | 20 | 12 | 0.25 | 349 | 93 | 89 | 19 |
| Com. Ex. 11 | — | — | — | 379 | 10 | 11 | 76 |

Further, the contact angle between the active material layer and the electrolyte, as well as the discharge capacity, the capacity retention rate and the high rate discharge characteristics that were obtained in the same manner as in "Evaluation" described above are shown in Table 10.

(iii) Example 32

A negative electrode was produced in the same manner as in Example 1, except that a CVD method was used as the method of forming the thin film comprising the active material, and that the thickness of the thin film for each side of a current collector sheet (an electrolytic Cu foil manufactured by FURUKAWA CIRCUIT FOIL CO., LTD, thickness: 20 μm) was 5 μm as shown in Table 9. The porosity of the thin film is shown in Table 9. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 10.

In the CVD method, a silane gas was used, and diluted with a carrier gas (hydrogen gas) such that the content of the silane gas was 10%. The temperature of the copper foil was 250° C. During CVD, the mixed gas of hydrogen and silane was flowed into the apparatus at a flow rate of 100 sccm, and the degree of vacuum in the apparatus was set to 3 Torr.

(iv) Comparative Example 11

A negative electrode was produced in the same manner as in Example 33, except that the thin film was directly used as the active material layer, without performing mask formation and blasting. The porosity of the thin film is shown in Table 9. Further, the contact angle between the active material layer and the electrolyte, as well as the discharge capacity, the capacity retention rate and the high rate discharge characteristics that were obtained in the same manner as in "Evaluation" described above are shown in Table 10.

Consideration

The negative electrodes whose active material layers were patterned by blasting had a lower contact angle than that of the negative electrodes which were not subjected to such a process, and exhibited increased wettability by the electrolyte. The batteries using such negative electrodes had favorable charge/discharge cycle characteristics and high rate discharge characteristics.

EXAMPLES 33 TO 34 AND COMPARATIVE EXAMPLES 12 TO 13

(i) Example 33

Particles of simple substances of metallic Ti and metallic Si (both manufactured by Kojundo Chemical Laboratory Co., Ltd., purity: 99.9%, average particle diameter: 20 to 26 μm) were mixed at a ratio of Ti:Si=2:8 (weight ratio), and then melted at 1700° C. with a high-frequency furnace. Thereafter, the melted product was formed into particles having an average particle diameter of about 17 to 23 μm by an atomization method. X-ray diffraction analysis on the alloy particles showed that all the particles had a crystalline phase, and the sizes of the crystallites (crystal grains) were as large as 8 to 19 μm.

The above-described alloy particles were placed into an attritor ball mill, together with stainless steel balls, at a ratio of alloy:balls=1:10 (weight ratio), and mechanical milling was performed for 3 hours with constant rotation of 6000 rpm under an Ar atmosphere. Thereafter, the resulting powder was collected under an Ar atmosphere, and used as the active material powder. X-ray diffraction analysis on the obtained active material powder confirmed that at least two kinds of phases, namely an intermetallic compound phase comprising $TiSi_2$ and a phase comprising a simple substance of Si were present, and both of them were amorphous phases.

The active material powder was classified into a particle diameter of not more than 5 μm, and 30 g of the resulting powder, 3 g of butyral resin (S-LEC B (trade name) manufactured by Sekisui Chemical Co., Ltd.) and a proper amount of ethyl acetate were mixed to give a paste. This paste was applied to both sides of a current collector sheet (an electrolytic Cu foil manufactured by FURUKAWA CIRCUIT FOIL CO., LTD., thickness: 15 μm) such that it had a thickness per side of 40 μm and a porosity of 70% after drying. Drying was performed at 60° C. under a flow of Ar.

The dried paste coating was sintered using a spark plasma sintering apparatus (manufactured by Sumitomo Coal Mining Co., Ltd.), thus forming a thin film comprising the active material. Here, under a vacuum atmosphere, the copper foil supporting the paste coating on both sides thereof was inserted between carbide dies of 60 mm×60 mm×thickness 30 mm (WC (tungsten carbide) manufactured by A.L.M.T. Corp.), and held for 3 minutes while applying a pressing pressure (0.8 t/cm$^2$) to the dies. At that time, a pulse current was applied to the above-described dies. The frequency of the pulse current was 720 Hz, the value of the applied current was 1200 A and the applied voltage was 1.5 V.

Thereafter, the above-described operation was repeated, while displacing the copper foil supporting the paste coating on both sides thereof by 6 cm each time. The maximum temperature reached during the process was 380° C. X-ray diffraction analysis on the obtained thin film proved that the active material maintained its amorphous state.

Then, a negative electrode was completed in the same manner as in Example 1, for which mask formation and blasting were performed. The porosity of the thin film is shown in Table 11. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 12.

(ii) Comparative Example 12

A negative electrode was produced in the same manner as in Example 35, except that the thin film was directly used as the active material layer, without performing mask formation and blasting. The porosity of the thin film is shown in Table 11. Further, the contact angle between the active material layer and the electrolyte, as well as the discharge capacity, the capacity retention rate and the high rate discharge characteristics that were obtained in the same manner as in "Evaluation" described above are shown in Table 12.

(iii) Example 34

A copper foil supporting a paste coating on both sides thereof was produced in the same manner as in Example 33, and the dried coating was rolled by a roller, together with the copper foil, and adjusted such that the thickness per side of the coating was about 12 μm. This was baked at 350° C. in an atmosphere of a nitrogen gas stream (flow rate: 5 L/min) to remove the resin component, followed by sintering at 45° C. for 10 hours, thus forming a thin film comprising the active material. X-ray diffraction analysis on the obtained thin film proved that the active material maintained its amorphous state.

Then, a negative electrode was completed in the same manner as in Example 1, for which mask formation and blasting were performed. The porosity of the thin film is shown in Table 11. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 12.

(iv) Comparative Example 13

A negative electrode was produced in the same manner as in Example 37, except that the thin film was directly used as the active material layer, without performing mask formation and blasting. The porosity of the thin film is shown in Table 11. Further, the contact angle between the active material layer and the electrolyte, as well as the discharge capacity, the capacity retention rate and the high rate discharge characteristics that were obtained in the same manner as in "Evaluation" described above are shown in Table 12.

TABLE 11

| Example No. | Composition | Weight ratio | Crystallinity | Film formation method | Thickness per side (μm) | Porosity (%) |
| --- | --- | --- | --- | --- | --- | --- |
| 33 | Ti—Si | Ti:Si = 20:80 | amorphous | plasma sintering | 12 | 10 |
| Com. Ex. 12 | Ti—Si | Ti:Si = 20:80 | amorphous | plasma sintering | 12 | 10 |
| 34 | Ti—Si | Ti:Si = 20:80 | amorphous | sintering | 12 | 10 |
| Com. Ex. 13 | Ti—Si | Ti:Si = 20:80 | amorphous | sintering | 12 | 10 |

TABLE 12

| Example No. | Mask width (μm) | Pattern width (μm) | Aspect ratio | Discharge capacity (mAh) | Capacity retention rate (%) | High rate discharge characteristics (%) | Contact angle (°) |
| --- | --- | --- | --- | --- | --- | --- | --- |
| 33 | 20 | 12 | 0.6 | 331 | 95 | 95 | 15 |
| Com. Ex. 12 | — | — | | 374 | 26 | 33 | 61 |
| 34 | 20 | 12 | 0.6 | 330 | 94 | 95 | 14 |
| Com. Ex. 13 | — | — | | 369 | 23 | 32 | 63 |

Consideration

The negative electrodes whose active material layers were patterned by blasting had a lower contact angle than that of the negative electrodes which were not subjected to such a process, and exhibited increased wettability by the electrolyte. The batteries using such negative electrodes had favorable charge/discharge cycle characteristics and high rate discharge characteristics.

EXAMPLE 35 AND COMPARATIVE EXAMPLE 14

(i) Example 35

An active material powder comprising a Ti—Si alloy and having been classified into a particle diameter of not more than 5 μm that was obtained in the same manner as in Example 33 was placed in an air blast shot peening apparatus (manufactured by Fuji Manufacturing Co., Ltd.). Then, it was ejected from a nozzle of 10 mmΦ such that a stress of 15 kg/cm$^2$ was applied to a current collector sheet (an electrolytic Cu foil manufactured by FURUKAWA CIRCUIT FOIL CO., LTD, thickness: 15 μm).

The operation of scanning this nozzle in the transverse direction of the copper foil at a speed of 3 cm/sec, moving the position of the nozzle by 10 mm in the longitudinal direction at the end portion of the copper foil, and thereafter scanning the nozzle in the opposite transverse direction at a speed of 3 cm/sec was performed repeatedly. Thus, the active material powder was delivered into the entire surface of the copper foil, thereby forming a thin film comprising the active material. The thickness of the thin film was about 13 μm. Upon completion of the formation of the thin film on one side of the copper foil, the thin film was also formed on the back side in the same manner. X-ray diffraction analysis on the obtained thin film proved that the active material maintained its amorphous state.

Then, a negative electrode was completed in the same manner as in Example 1, for which mask formation and blasting were performed. The porosity of the thin film is shown in Table 13. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 14.

(ii) Comparative Example 14

A negative electrode was produced in the same manner as in Example 35, except that the thin film was directly used as the active material layer, without performing mask formation and blasting. The porosity of the thin film is shown in Table 13. Further, the contact angle between the active material layer and the electrolyte, as well as the discharge capacity, the capacity retention rate and the high rate discharge characteristics that were obtained in the same manner as in "Evaluation" described above are shown in Table 14.

TABLE 13

| Example No. | Composition | Weight ratio | Crystallinity | Film formation method | Thickness per side (μm) | Porosity (%) |
|---|---|---|---|---|---|---|
| 35 | Ti—Si | Ti:Si = 20:80 | amorphous | shot peening | 13 | 25 |
| Com. Ex. 14 | Ti—Si | Ti:Si = 20:80 | amorphous | shot peening | 13 | 25 |

TABLE 14

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 35 | 20 | 12 | 0.65 | 294 | 94 | 94 | 19 |
| Com. Ex. 14 | — | — | | 342 | 16 | 28 | 70 |

Consideration

The negative electrodes whose active material layers were patterned by blasting had a lower contact angle than that of the negative electrodes which were not subjected to such a process, and exhibited increased wettability by the electrolyte. The batteries using such negative electrodes had favorable charge/discharge cycle characteristics and high rate discharge characteristics.

EXAMPLE 36

A negative electrode was produced in the same manner as in Example 18, except that the mask portions were formed in the following manner. Here, a polyurethane resin dispersion (RESAMINE D (trade name) manufactured by Dainichiseika Color & Chemicals Mfg. Co., Ltd.) was applied onto a thin film comprising Si by screen printing such that square mask portions of 10 μm×10 μm and patterned portions having a width of 6 μm were arranged in a grid configuration.

Then, blasting and so on were performed in the same manner as in Example 18, thus completing a negative electrode. The porosity of the thin film is shown in Table 15. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 16.

TABLE 15

| Example No. | Composition | Crystallinity | Film formation method | Thickness per side (μm) | Porosity (%) |
|---|---|---|---|---|---|
| 36 | Si | amorphous | vacuum evaporation | 6 | 5 |

TABLE 16

| Example No. | Mask width (μm) | Pattern width (μm) | Aspect ratio | Discharge capacity (mAh) | Capacity retention rate (%) | High rate discharge characteristics (%) | Contact angle (°) |
|---|---|---|---|---|---|---|---|
| 36 | 10 | 6 | 0.6 | 346 | 96 | 94 | 18 |

EXAMPLES 37 TO 43

(i) Examples 37 TO 41

Negative electrodes were produced in the same manner as in Example 18, except that the fine particles collided with the surface to be treated by blasting was changed to those listed in Table 17. Even when $Al_2O_3$ and SiC were used in place of $Si_3N_4$, a similar patterning to that achieved with $Si_3N_4$ could be achieved. It should be noted that the average particle diameter of $Si_3N_4$ was changed in Examples 37 to 39, and, as a result, the width and the depth of the grooves formed in the side surfaces of the deposited films changed. The maximum groove width substantially agreed with the width of the collided fine particles. Furthermore, the groove depth was approximately ½ to ⅔ the average particle diameter of the collided fine particles.

The contact angle between the active material layer and the electrolyte, as well as the discharge capacity, the capacity retention rate and the high rate discharge characteristics that were obtained in the same manner as in "Evaluation" described above are shown in Table 18. Further, the maximum width and the maximum depth of the grooves formed in the side surfaces of the deposited films are shown in Table 18.

(ii) Examples 42 TO 43

Negative electrodes were produced in the same manner as in Example 18, except that the fine particles collided with the surface to be treated by blasting was changed to those listed in Table 17. When fine particles of soft polyethylene or walnut were used in place of $Si_3N_4$, it was not possible to pattern the negative electrode even if the spraying time was increased. The contact angle between the active material layer and the electrolyte, as well as the discharge capacity, the capacity retention rate and the high rate discharge characteristics that were obtained in the same manner as in "Evaluation" described above are shown in Table 18.

TABLE 17

| Example No. | Composition | Collided fine particles | Crystallinity | Film formation method | Thickness per side (μm) | Porosity (%) |
|---|---|---|---|---|---|---|
| 37 | Si | $Si_3N_4$ (particle diameter: 3 μm) | amorphous | vacuum evaporation | 6 | 5 |
| 38 | Si | $Si_3N_4$ (particle diameter: 10 μm) | amorphous | vacuum evaporation | 6 | 5 |
| 39 | Si | $Si_3N_4$ (particle diameter: 15 μm) | amorphous | vacuum evaporation | 6 | 5 |
| 40 | Si | $Al_2O_3$ (particle diameter: 1 μm) | amorphous | vacuum evaporation | 6 | 5 |
| 41 | Si | SiC (particle diameter: 1.5 μm) | amorphous | vacuum evaporation | 6 | 5 |
| 42 | Si | polyethylene (particle diameter: 0.5 μm) | amorphous | vacuum evaporation | 6 | 5 |
| 43 | Si | walnut (particle diameter: 45 μm) | amorphous | vacuum evaporation | 6 | 5 |

TABLE 18

| Example No. | Mask width (μm) | Pattern width (μm) | Groove width (μm) | Groove depth (μm) | Discharge capacity (mAh) | Capacity retention rate (%) | High rate discharge characteristics (%) | Contact angle (°) |
|---|---|---|---|---|---|---|---|---|
| 37 | 20 | 12 | 4 | 3 | 360 | 94 | 94 | 18 |
| 38 | 20 | 12 | 10 | 7 | 322 | 84 | 79 | 23 |
| 39 | 20 | 12 | 16 | 12 | 213 | 55 | 24 | 49 |
| 40 | 20 | 12 | 1 | 0.5 | 362 | 94 | 95 | 19 |
| 41 | 20 | 12 | 2 | 1 | 367 | 93 | 96 | 19 |
| 42 | 20 | 12 | — | — | 398 | 13 | 12 | 71 |
| 43 | 20 | 12 | — | — | 401 | 22 | 15 | 73 |

Consideration

From the foregoing, it was clear that use of high hardness materials such as $Si_3N_4$, $Al_2O_3$ and SiC as the collided fine particles was desirable. Furthermore, it was revealed that, when a groove larger than ½ the mask width was formed in the side surfaces of the deposited films, as in the case of Example 39, the wettability was lowered, reducing the battery characteristics. The reason seems to be that the electrolyte permeability was lowered since the number of the grooves formed in the side surfaces of the deposited films was reduced. Further, when the depth of the groove was larger than ½ the mask width, the absolute amount of the active material decreased, so that the capacity also decreased.

EXAMPLES 44 TO 48

The same patterned negative electrode as used in Example 1 was subjected to heat treatment under the conditions (temperature, time and ambient gas) listed in Table 19, thus diffusing Cu from the current collector sheet into the active material layer. The pressure of the ambient gas (Ar) was one atmosphere. X-ray diffraction analysis on the heat-treated active material layers showed that the crystallinity was changed by the temperature. The results are shown in Table 19. Further, the contact angles between the active material layers and the electrolyte, as well as the discharge capacity, the capacity retention rate and the high rate discharge characteristics that were obtained in the same manner as in "Evaluation" described above are shown in Table 20.

TABLE 19

| Example No. | Composition | Heat treating conditions | Crystallinity | Thickness per side (μm) | Porosity (%) |
|---|---|---|---|---|---|
| 44 | Si | 400° C. 3 hours Ar | amorphous | 6 | 5 |
| 45 | Si | 500° C. 3 hours Ar | low crystalline | 6 | 5 |
| 46 | Si | 600° C. 3 hours Ar | low crystalline | 6 | 5 |
| 47 | Si | 650° C. 3 hours Ar | crystalline | 6 | 5 |
| 48 | Si | 700° C. 3 hours Ar | Si phase lost | 6 | 5 |

TABLE 20

| Example No. | Mask width (μm) | Pattern width (μm) | Discharge capacity (mAh) | Capacity retention rate (%) | High rate discharge characteristics (%) | Contact angle (°) |
|---|---|---|---|---|---|---|
| 44 | 20 | 12 | 351 | 96 | 95 | 16 |
| 45 | 20 | 12 | 309 | 94 | 89 | 18 |
| 46 | 20 | 12 | 283 | 95 | 88 | 20 |
| 47 | 20 | 12 | 253 | 23 | 32 | 21 |
| 48 | 20 | 12 | — | — | — | 25 |

Consideration

When the heat treatment was performed at a temperature of not less than 500° C., Si changed from an amorphous state into a low crystalline state, and the average particle diameter of the crystallites (crystal grains) was enlarged to 15 nm and 50 nm in Example 45 and Example 46, respectively. Furthermore, not only the spectra of the single phases of Si and Cu, but also the spectrum of a Cu—Si compound was observed.

In Example 47, Si changed into a complete crystalline state, and the average particle diameter of the crystallites (crystal grains) was 200 nm. Further, in Example 48, spectrum of the Si single phase could not be confirmed, and only the spectrum of the Cu—Si compound was shown.

The discharge capacity showed a tendency to decrease with an increase in the intensity of the spectrum of the Cu—Si compound. This is because Si serving as the active material was consumed by reacting with Cu. It should be noted that the fabrication of a battery and the evaluation thereof were not carried out for the negative electrode of Example 48, since it was difficult to maintain the shape of the electrode after the heat treatment.

Example 44 had a slightly decreased capacity than that of Example 1, but exhibited improved charge/discharge cycle characteristics and high rate discharge characteristics. This is related to the fact that a slight diffusion of Cu occurred at the interface between the active material layer and the current collector sheet, thus forming high-strength bonding therebetween. Furthermore, it seems that formation of a Cu—Si compound having conductivity facilitated transfer of electrons.

A polished cross section was formed in the negative electrodes of Example 44 and Example 47, and the cross sections were observed by SEM and EPMA (Electron Probe Micro-Analysis). As a result, it was revealed that, in Example 44, Cu was diffused to a thickness of about 1 μm from the interface between the current collector sheet and the active material layer in the direction towards the active material layer. Cu was not present at positions closer to the surface. On the other hand, in Example 47, Cu was diffused throughout the active material layer, and the presence of Cu was also confirmed on the outermost surface of the active material layer.

From the foregoing, it was revealed that the element constituting the current collector sheet made the cycle characteristics favorable by diffusing into the portion of the active material layer that was in the vicinity of the current collector sheet. However, it is preferable that the element constituting the current collector sheet is not present on the surface layer of the active material layer.

EXAMPLES 49 TO 52

An ingot of a simple substance of Si or Sn (each manufactured by Kojundo Chemical Laboratory Co., Ltd., purity: 99.999%, average particle diameter: 5 mm to 35 mm) was placed in a graphite crucible. This crucible and an electrolytic Cu foil (manufactured by FURUKAWA CIRCUIT FOIL CO., LTD., thickness: 20 μm) serving as the current collector sheet were introduced into a vacuum evaporation apparatus, followed by vacuum evaporation using an electron gun.

In the case of Si, the evaporation was conducted under the conditions of an acceleration voltage of −8 kV and a current of 150 mA. In the case of Sn, the acceleration voltage was set to −8 kV, and the current was set to 100 mA. The degree of vacuum was set to $3 \times 10^{-5}$ Torr in each case. Concurrently with the electron beam irradiation, oxygen was flowed into the apparatus at a flow rate of 20 sccm.

After the evaporation was completed for one side of the current collector sheet, further vacuum evaporation was also conducted for the back side (the surface with no deposition) in the same manner, thus forming a thin film comprising the active material on both sides. As a result of conducting X-ray diffraction analysis on these thin films, crystalline peaks attributed to Cu, which constituted the current collector sheet, were observed, and a broad peak was detected at a position of 2θ=15-40° in all the films. These results revealed that the active materials were amorphous.

The amount of oxygen included in the thin film was measured by infrared spectrophotometry (JIS Z 2613), and the composition (the x value in Table 21) of the active material was calculated. The overall thickness of the negative electrode was about 36 to 38 μm, and the thickness per side of the thin film comprising the active material was about 8 to 9 μm.

Then, a negative electrode was completed in the same manner as in Example 1, for which mask formation and blasting were performed. The porosity of the thin film is shown in Table 21. Further, the mask width and the pattern width during the masking process, the aspect ratio of the deposited films, the contact angle between the active material layer and the electrolyte, as well as the discharge capacity, the capacity retention rate and the high rate discharge characteristics that were obtained in the same manner as in "Evaluation" described above are shown in Table 22.

TABLE 21

| Example No. | Composition | X value | Crystallinity | Thickness per side (μm) | Porosity (%) |
| --- | --- | --- | --- | --- | --- |
| 49 | SiOx | x = 0.5 | amorphous | 8 | 6 |
| 50 | SiOx | x = 1.1 | amorphous | 8 | 6 |
| 51 | SnOx | x = 0.9 | amorphous | 9 | 10 |
| 52 | SnOx | x = 1.6 | low crystalline | 9 | 12 |

TABLE 22

| Example No. | Mask width (μm) | Pattern width (μm) | Aspect ratio | Discharge capacity (mAh) | Capacity retention rate (%) | High rate discharge characteristics (%) | Contact angle (°) |
| --- | --- | --- | --- | --- | --- | --- | --- |
| 49 | 20 | 12 | 0.4 | 310 | 94 | 90 | 17 |
| 50 | 20 | 12 | 0.4 | 286 | 97 | 89 | 19 |
| 51 | 20 | 12 | 0.45 | 302 | 91 | 91 | 16 |
| 52 | 20 | 12 | 0.45 | 271 | 94 | 92 | 18 |

Consideration

From Tables 21 to 22, it is seen that, when an oxide was formed as the active material layer, a battery having a high capacity and long life could also be obtained as with Example 1. Additionally, although not described here, a similar result was shown when Al, Ge, Pb, Bi or Sb was used in place of Si or Sn. Furthermore, a similar result could be obtained when nitrogen was flowed into the apparatus, in place of oxygen.

Further, a similar result could be obtained when the evaporation was performed using, as the evaporation source for the vacuum evaporation, at least one selected from the group consisting of an oxide, a nitride and a sulfide of an element M1 that is at least one selected from the group consisting of Si, Sn, Al, Ge, Pb, Bi and Sb.

When an oxide is used as the active material, however, it is necessary to reduce the oxide once, so that there is a tendency in which a part of the positive electrode capacity is used as an irreversible capacity, thus reducing the battery capacity. Therefore, in order to prevent a capacity decrease, metallic Li may be attached to the negative electrode surface or the negative electrode current collector.

INDUSTRIAL APPLICABILITY

The present invention is applicable to various forms of non-aqueous electrolyte secondary batteries, and can be applied not only to the cylindrical battery shown in the examples, but also to batteries having shapes such as a coin shape, a square shape and a flate shape. Futhermore, the present invention is applicable to batteries having either wound or laminated electrode plate group. The non-aqueous electrolyte is useful as the main power source for mobile communication devices, portable electronic devices and the like.

The invention claimed is:

1. A negative electrode for a non-aqueous electrolyte secondary battery, comprising:
    an active material layer capable of electrochemically absorbing and desorbing at least Li; and
    a current collector sheet that supports said active material layer thereon and that does not react with Li,
    wherein said active material layer includes a plurality of deposited films or sintered films supported on a surface of said current collector sheet,
    each of said deposited films or sintered films comprises a top surface side and a lateral side surface and are spaced apart from immediately adjacent said deposited or sintered films, and
    each of said deposited or sintered films is provided with at least one groove formed in a lateral side surface thereof, said groove extending from the top surface side to said surface of said current collector sheet.

2. The negative electrode for a non-aqueous electrolyte secondary battery in accordance with claim 1,
    wherein said plurality of deposited films or sintered films each have an aspect ratio defined by "film thickness"÷"shortest width of top surface" of not less than 0.1.

3. The negative electrode for a non-aqueous electrolyte secondary battery in accordance with claim 2,
    wherein said aspect ratio is not less than 0.3.

4. The negative electrode for a non-aqueous electrolyte secondary battery in accordance with claim 1,
    wherein said plurality of deposited films or sintered films are arranged in a grid configuration, a staggered grid configuration or a honeycomb configuration on a surface of said current collector sheet.

5. The negative electrode for a non-aqueous electrolyte secondary battery in accordance with claim 1,
    wherein, in a discharged state, said plurality of deposited films or sintered films have an average height of not less than 1 μm and not more than 30 μm.

6. The negative electrode for a non-aqueous electrolyte secondary battery in accordance with claim 5,
    wherein said average height of said deposited films or sintered films is not less than 2 μm and not more than 20 μm.

7. The negative electrode for a non-aqueous electrolyte secondary battery in accordance with claim 1,
    wherein, in a discharged state, the shortest distance between said deposited films or sintered films that are adjacent with each other is narrower than the shortest width of said top surface.

8. The negative electrode for a non-aqueous electrolyte secondary battery in accordance with claim 7,
    wherein a relationship between the shortest width: W1 and the shortest distance: W2 satisfies $0.1W1 \leq W2 \leq 0.8W1$.

9. The negative electrode for a non-aqueous electrolyte secondary battery in accordance with claim 1,
    wherein each of said deposited films or sintered films includes an element M1 that electrochemically reacts with Li, and said element M1 is at least one selected from the group consisting of Si, Sn, Al, Ge, Pb, Bi and Sb.

10. The negative electrode for a non-aqueous electrolyte secondary battery in accordance with claim 9,
    wherein an element M1 forms a low crystalline or amorphous region in each of said deposited films or sintered films.

11. The negative electrode for a non-aqueous electrolyte secondary battery in accordance with claim 9,
    wherein a content of an element M1 in each of said deposited films or sintered films is not less than 40 wt %.

12. The negative electrode for a non-aqueous electrolyte secondary battery in accordance with claim 1,
    wherein each of said deposited films or sintered films includes an element M2 that does not electrochemically react with Li, and said element M2 is at least one selected from the group consisting of transition metal elements.

13. The negative electrode for a non-aqueous electrolyte secondary battery in accordance with claim 12,
    wherein a content of an element M2 is higher on said current collector sheet side than that on a surface side of each of said deposited films or sintered films.

14. The negative electrode for a non-aqueous electrolyte secondary battery in accordance with claim 12,
    wherein said transition metal elements are at least one selected from the group consisting of Cu, Ti, Ni, and Fe.

15. The negative electrode for a non-aqueous electrolyte secondary battery in accordance with claim 1,
    wherein the top surface sides of each deposited or sintered film are substantially coplanar.

16. The negative electrode for a non-aqueous electrolyte secondary battery in accordance with claim 1,
    wherein a width of said groove extending towards said surface of said current collector sheet is not more than 1/10 and not less than 1/100 the shortest width of said top surface side.

17. The negative electrode for a non-aqueous electrolyte secondary battery in accordance with claim 1,
    wherein a depth of said groove extending towards said surface of said current collector sheet is not more than 1/10 and not less than 1/100 the shortest width of said top surface side.

18. The negative electrode for a non-aqueous electrolyte secondary battery in accordance with claim 1,
    wherein the lateral side surface of said deposited or sintered films has a plurality of said grooves extending towards said surface of said current collector sheet, and a sum of widths of said grooves is not more than 2/3 the shortest width of said top surface side.

19. The negative electrode for a non-aqueous electrolyte secondary battery in accordance with claim 1,
wherein said plurality of deposited films or sintered films each have a porosity of not more than 30%.

20. The negative electrode for a non-aqueous electrolyte secondary battery in accordance with claim 1,
wherein plurality of deposited films or sintered films each contain an oxide represented by the chemical formula $SiO_x$, where $x<2$.

21. A non-aqueous electrolyte secondary battery comprising:
a positive electrode capable of absorbing and desorbing lithium;
the negative electrode in accordance with claim 1;
a separator interposed between said positive electrode and said negative electrode; and
a non-aqueous electrolyte.

* * * * *